Patented Aug. 7, 1923.

1,464,224

UNITED STATES PATENT OFFICE.

PEREZ M. STEWART, OF PASADENA, CALIFORNIA.

VARNISH, PAINT, OR WATERPROOFING COMPOSITION AND PROCESS FOR MAKING SAME.

No Drawing. Application filed October 19, 1922. Serial No. 595,681.

*To all whom it may concern:*

Be it known that I, PEREZ M. STEWART, a citizen of the United States, residing at Pasadena, in the county of Los Angeles, and State of California, have invented a new and useful Varnish, Paint, or Waterproofing Composition and Process for Making Same, of which the following is a specification.

My invention relates to the production of a product useful as a base for varnishes, paints or water proofing material and while it may be used directly for some purposes it is generally intended to be mixed with different pigments, covering material, and the like for water proofing, painting or varnishing purposes.

The object of my invention is to produce an exceptionally tenacious, firm and waterproof material which may be used in a great variety of mixtures such as varnish, paint or water proofing.

An object of my invention is to provide a process wherein vegetable oil may be polymerized and oxidized and rendered nonsticky, tenacious, stable, and not readily decomposed after being applied as a paint, varnish or water proof material.

In carrying out my process while there may be various materials substituted therefor I prefer to first mix with chinawood oil a quantity of pentoxide of phosphorus, preferably adding to one gallon of chinawood oil approximately one-tenth of one per cent of pentoxide of phosphorus. To this mixture I add a previously mixed liquid composed of linseed oil to which resin or rosin has been added. Preferably to 85/100 of a gallon of linseed oil I add 15/100 of the resin or rosin while heating the same. The linseed oil mixture is then added, while hot, to the chinawood oil mixture.

Unsaturated vegetable oil, especially chinawood oil, apparently is polymerized by the action of the pentoxide of phosphorus and polymerization continues upon mixing the pentoxide and chinawood oil with the heated linseed oil and its accompanying resin or rosin. The mixture is preferably heated for some time to complete or further permit the polymerizing action to continue. The mixture is then cooled.

The product obtained is a very tenacious and firm material and is capable of a wide number of applications. A special advantage or advantageous use of the same appears in its utility as a base for varnish, paint or water proofing material.

For the production of paint the mixture is diluted with suitable solvent such as kerosene oil and mixed with a quantity of pigment of which a number may be used. The paint produced thereby has very high resistance to sunlight, moisture, alkali, chemical fumes and gases and is a marked improvement over the paints ordinarily employed.

The polymerized vegetable oil may be mixed with a great variety of fillers, but preferably a resin or rosin should be used as stated. The rosin referred to may constitute ordinary pine tar rosin and the resin the so called "Cumar" or cumarone resin product. Other fillers such as waxes, asphalts, paraffines, etc., may be used or may be mixed with resin or rosin mixture. My invention is therefore not limited to any particular materials or method of mixing since the same may be modified in a number of different ways without departing from the spirit of the invention. My invention is of the scope set forth in the following claims:

I claim:

1. In a process of making a base for varnish, paint or water proofing material that step which comprises mixing unsaturated vegetable oil with pentoxide of phosphorus.

2. In a process of making a base for varnish, paint or water proofing material that step which comprises mixing chinawood oil with pentoxide of phosphorus.

3. The process of producing a base for varnish, paint or water proofing material in which unsaturated vegetable oil is added to pentoxide of phosphorus, linseed oil and "Cumar" are mixed and heated, and said linseed oil mixture is mixed with said vegetable oil mixture.

4. A process of preparing a base suitable for varnish, paint or water proofing material in which unsaturated vegetable oil is mixed with pentoxide of phosphorus and a filler is added thereto and the resulting mixture heated to continue the reaction.

5. A process of preparing a paint, varnish, or water proofing material in which unsaturated vegetable oil is polymerized into a tenacious material and mixed with "Cumar."

Signed at Los Angeles, California, this 31st day of August, 1922.

PEREZ M. STEWART.